United States Patent
Jernigan et al.

[11] 3,745,353
[45] July 10, 1973

[54] BRAGG ANGLE COLLINEAR HETERODYNING FILTER

[75] Inventors: James L. Jernigan, Inyokern; Thomas F. O'Neill, Jr., China Lake, both of Calif.

[73] Assignee: The United States of America as represented by the Secretary of the Navy, Washington, D.C.

[22] Filed: Oct. 26, 1971

[21] Appl. No.: 192,458

[52] U.S. Cl. .................. 250/216, 350/161, 356/71
[51] Int. Cl. .............................................. G02f 1/18
[58] Field of Search ......... 250/216, 213 R, 213 VT; 356/71; 350/161, 160 R

[56] References Cited
UNITED STATES PATENTS

| | | |
|---|---|---|
| 3,483,386 | 12/1969 | Jernigan .............................. 250/216 |
| 3,617,761 | 11/1971 | Cooper, Jr. ...................... 250/216 X |
| 3,544,795 | 12/1970 | Korpel .............................. 250/216 X |
| 3,432,647 | 3/1969 | Wilmotte ............................ 235/181 |

*Primary Examiner*—Walter Stolwein
*Attorney*—R. S. Sciascia, Roy Miller et al.

[57] ABSTRACT

A Bragg angle matched filter wherein the light rays reflected by the delay cell are combined with the modulated rays which rebound from the wave plate and travel back through the delay cell. The combined rays are converged by a lens onto an aperture. A photodetector beyond the aperture yields an output proportional to the intensity of the converged wave. Planar waves entering the lens give a maximum output from the photodetector and, therefore, indicate a correlation peak.

4 Claims, 2 Drawing Figures

BRAGG ANGLE COLLINEAR HETERODYNING FILTER

BACKGROUND OF THE INVENTION

The present invention is an improvement over the device disclosed by James L. Jernigan, a co-inventor of the present invention, in U. S. Pat. No. 3,483,386 entitled "Bragg Angle Matched Filter For Producing And Recognizing Coded Pulses", and U. S. Patent Application Ser. No. 270,366 filed 10 July 1972, a continuation-in-part of abandoned U. S. Patent Application Ser. No. 763,054 entitled "An Inverted Time Impulses Bragg Angle Matched Filter", which disclosures are incorporated herein by reference.

The imperfections inherent in the prior devices include the aberrations introduced by all optical components, each additional component adding to the disturbance; the difficult task of aligning the reflective surfaces; and the relatively high energy losses due to reflection and scattering caused by the beams' impingement on, and interaction with, numerous reflective and transmissive surfaces.

The present invention reduces the amount of energy lost by utilizing the beam inherently reflected by the cell's surface; and reduces the aberrations introduced, and eliminates the difficult task of alignment, by reducing the number of optical components included.

SUMMARY OF THE INVENTION

A means for encoding a decoding electrical signals using monochromatic spatially coherent light, an ultrasonic delay cell, a wave plate, and a photodetector wherein the light impinges on the cell at the Bragg angle. A portion is reflected and the remainder is transmitted, modulated, and reflected by the wave plate. The cell reflected light and the plate reflected light are combined and focused by a lens, and detected by the photodetector.

The cell may be pulsed by a reference signal coupled to one end, and by an input signal coupled to the other end, of the cell. The input signal may be the output of the photodetector or any signal of interest. If the system code is matched, the photodetector output is maximum.

DESCRIPTION OF THE PREFERRED EMBODIMENT

Figure 1:
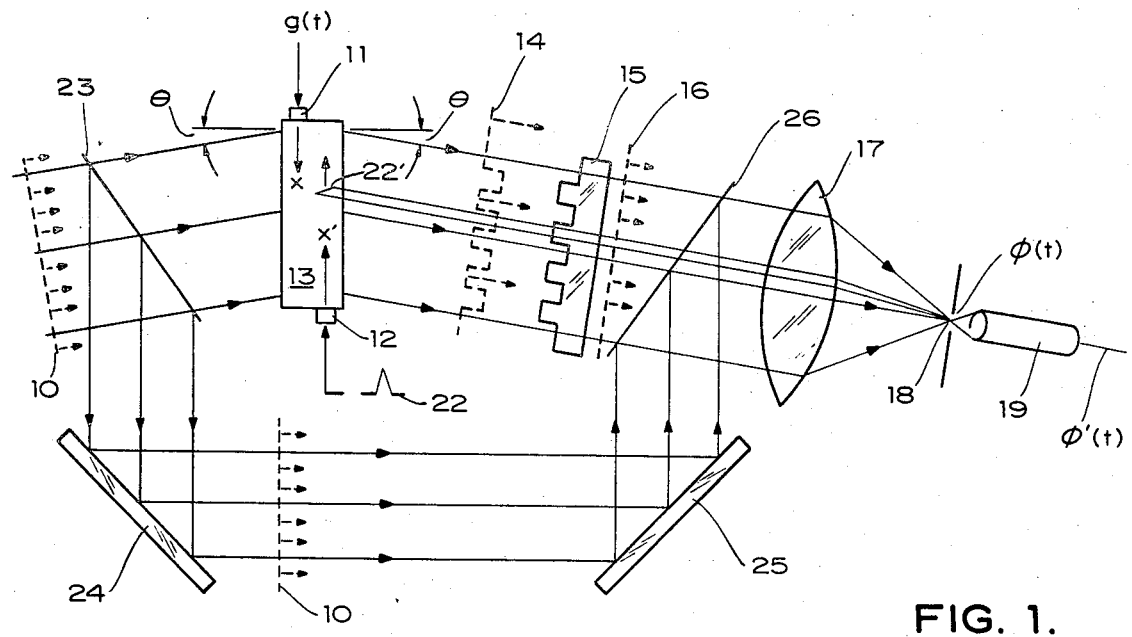
FIG. 1 is a schematic diagram of the prior art as disclosed in Patent Application Ser. No. 763,054 of James L. Jernigan.

The present invention is an improvement over the devices disclosed by James L. Jernigan, a co-inventor of the present invention, in U. S. Pat No. 3,483,386 and Patent Application Ser. No. 763,054, an embodiment of which is shown in FIG. 1, which are assigned to the assignee of the present invention and incorporated herein by reference. Some of coherent light 10 which passes through beam splitter 32 of FIG. 1 is not transmitted through cell 13, but is, instead, reflected by the surface upon which it impinges. Therefore, a portion of the light, or energy of th system, is lost. As a result, the system's efficiency is reduced.

Figure 2:
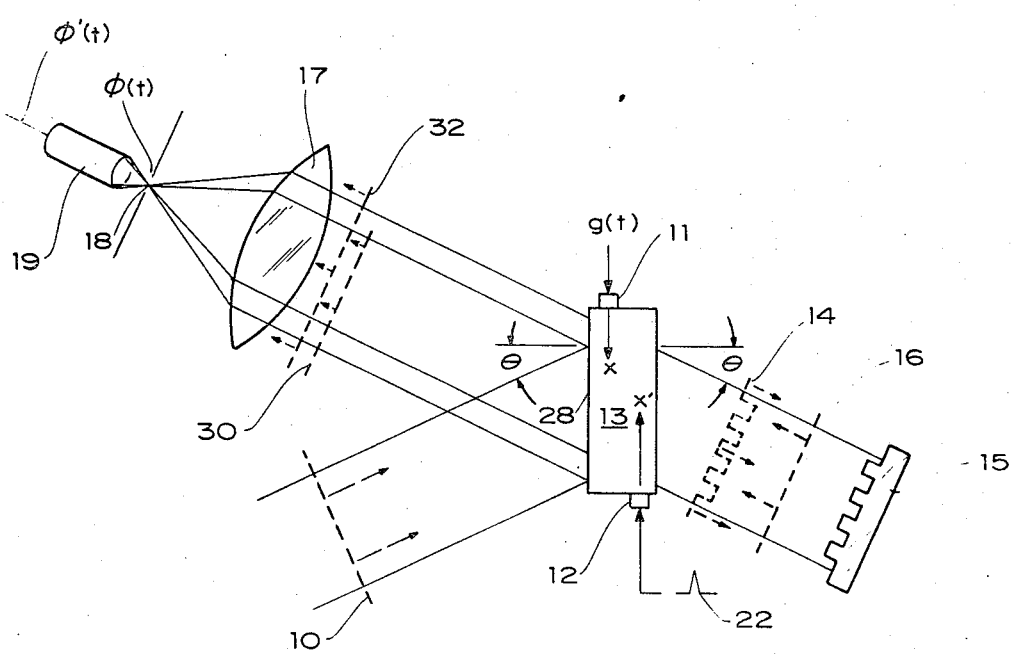
FIG. 2 is a schematic diagram of the present invention.

By utilizing the light inherently reflected by the irradiated surface 28 of cell 13, as shown in FIG. 2, the efficiency of the system is improved.

The present invention includes monochromatic, spatially coherent light 10, double ended untrasonic delay cell 13 having transducers 11 and 12, wave plate 15, lens 17, aperture 18, and photodetector 19. Light 10 impinges on cell 13 at the Bragg angle, shown by $\theta$. Reference signal 22 is coupled to transducer 12; and signal of interest $g(t)$ is coupled to transducer 11. The signals set up ultrasonic waves X' and X, respectively, in cell 13.

The present invention extends to applications such as that disclosed by James L. Jernigan in U. S. Pat. No. 3,483,386 wherein the coded output signal, shown in FIG. 2 as the photodetector output responsive to reference signal 22, is independently and remotely generated. When as in the present invention, monochromatic, spatially coherent light and the modulated wave are collinearly heterodyned, detection will be indicated linearly rather than by the square-law function.

The present invention operates as follows:

Monocromatic, spatially coherent light 10 impinges on, and a portion is reflected by, surface 28 of cell 13. The portion reflected is shown as wave 30. Most of light 10 passes through cell 13 and is modulated by wave X'.

The modulated light exiting cell 13 contains the system code, and is depicted as waveform 14. Waveform 14 inpinges on wave plate 15 which converts the coded waveform into planar waveform 16. Wave plate 15 converts into planar waves only those waveforms which match the system code.

Waveform 16, directed back through cell 13, combined with the cell reflected light shown by waveform 30 to waveform 32. The light of waveform 32 is converged by lens 17 onto aperture 18 and detected by photodetector 19. The electrical signal output $\phi'(t)$ of photodetector 19 is proportional to the intensity of the converged wave. Output $\phi'(t)$ may be utilized in radar systems and returned as signal $g(t)$ to transducer 11. In any case, signal $g(t)$ sets up ultrasonic wave X in cell 13.

Now, the transmitted light will be modulated by the information in signal $g(t)$. If the system code is matched, waveform 16 will once again be planar, and will combine with the light of waveform 30 to form planar waveform 32. Planar waves entering the lens give a maximum output from the photodetector and, therefore, indicate a correlation peak. As a result, the present invention produces and recognizes pulses which contain the code of the system.

It should be pointed out that by the time waveform 16 arrives at cell 13 ultrasonic wave X' or X, whichever the case may be, will have deteriorated, and therefore, will not modulate waveform 16. And, before the next ultrasonic wave is set up waveform 16 will have passed thru cell 13.

The inherent advantage of the optical system of the present invention over somewhat equivalent electrical systems is the relatively broad bandwidth which can be achieved. There are indications that a bandwidth equal to 20 percent of the microwave center frequency is possible. And, the advantages of the present invention over the prior device of Jernigan are the elimination of beam-splitter 23, mirrors 24 and 25, and beam-splitter 26; and the utilization of the light reflected by surface 28, heretofore lost. As a result, the amount of optical apparatus is reduced, the alignment task is eliminated, and the system's efficiency is improved.

What is claimed is:

1. A matched filter system for recognizing a coded pulse of a given character, comprising:
   a source of monochromatic spatially coherent light;
   means for modulating said light in response to a first modulating signal, including an ultrasonic delay cell positioned so that said light impinges on the cell at the Bragg angle;
   a wave plate to intercept the modulated wave;
   means for combining the monochromatic spatially coherent light inherently reflected by the surface on which said light impinges with the intercepted, modulated wave; and
   means for focusing the combined light waves onto a photodetector.

2. The matched filter system of claim 1 wherein said systems further comprises;
   means for modulating said light in response to a second modulating signal.

3. The matched filter system of claim 2 wherein;
   said second modulating signal is applied to said ultrasonic delay cell, and
   said first modulating signal includes the output of said photodetector responsive to said second modulating signal.

4. The matched filter system of claim 3 wherein;
   said second modulating signal is coupled to one end of said cell and said first modulating signal is coupled to the other end of said cell, such that ultrasonic waves in response to said second signal propagate substantially longitudinally in said cell from said one end and ultrasonic waves in response to said first signal propagate substantially longitudinally from said other end.

* * * * *